United States Patent
Nommensen et al.

(10) Patent No.: US 12,172,695 B2
(45) Date of Patent: Dec. 24, 2024

(54) CATALYTIC CONVERTER GUARD

(71) Applicant: Monroe Truck Equipment, Inc., Monroe, WI (US)

(72) Inventors: Daniel Nommensen, Monroe, WI (US); Eric Falsey, Monroe, WI (US)

(73) Assignee: Monroe Truck Equipment, Inc., Monroe, WI (US)

( * ) Notice: Subject to any disclaimer, the term of this patent is extended or adjusted under 35 U.S.C. 154(b) by 0 days.

(21) Appl. No.: 17/896,509

(22) Filed: Aug. 26, 2022

(65) Prior Publication Data

US 2023/0061602 A1 Mar. 2, 2023

Related U.S. Application Data

(60) Provisional application No. 63/238,374, filed on Aug. 30, 2021.

(51) Int. Cl.
*B62D 21/10* (2006.01)
*B62D 25/20* (2006.01)

(52) U.S. Cl.
CPC ......... *B62D 21/10* (2013.01); *B62D 25/2009* (2013.01)

(58) Field of Classification Search
CPC .... B62D 21/10; B62D 25/2009; B62D 21/00; B62D 21/02; B62D 21/155; B60R 25/00; F01N 3/10; F01N 3/24
See application file for complete search history.

(56) References Cited

U.S. PATENT DOCUMENTS

| | | | | |
|---|---|---|---|---|
| 8,002,232 B2* | 8/2011 | Meislahn | ............ | E05B 73/0005 248/58 |
| 8,963,699 B2* | 2/2015 | Potter | ...................... | B60R 25/20 70/57.1 |
| D879,008 S * | 3/2020 | Pringle | ........................ | D12/223 |
| 11,708,783 B1* | 7/2023 | Corkery | .............. | F01N 13/1888 248/551 |
| 2011/0036130 A1* | 2/2011 | Hisler | ....................... | F01N 3/28 70/57.1 |
| 2021/0253062 A1 | 8/2021 | Tamagni | | |

* cited by examiner

*Primary Examiner* — Joseph D. Pape
(74) *Attorney, Agent, or Firm* — Quarles & Brady LLP

(57) ABSTRACT

A catalytic converter guard for protecting a catalytic converter on a motor vehicle. The catalytic converter guard can include a set of mounting flanges, an input guard plate, an output guard plate, and a bottom plate coupled to the set of mounting flanges and the input and output guard plates. The set of mounting flanges can be configured to be coupled to a set of frame rails of a motor vehicle. The input guard plate can be configured to be positioned adjacent an input of at least one catalytic converter and can include at least one cutout shaped to permit at least one input exhaust pipe to pass therethrough. The output guard plate can be configured to be positioned adjacent an output of the at least one catalytic converter and can include at least one cutout shaped to permit at least one output exhaust pipe to pass therethrough.

21 Claims, 8 Drawing Sheets

CATALYTIC CONVERTER GUARD

CROSS-REFERENCE TO RELATED APPLICATIONS

This application claims priority to U.S. Provisional Patent Application No. 63/238,374, filed Aug. 30, 2021, titled "Catalytic Converter Guard," the entirety of which is incorporated herein by reference.

BACKGROUND

Catalytic convertors are an important component of a motor vehicle's exhaust system. They aid in converting harmful substances in a motor vehicle's exhaust gases, like carbon monoxide, nitric oxide, nitrogen dioxide, and hydrocarbons into less harmful substances such as carbon dioxide and water vapor through catalysis using precious metals such as platinum, palladium, and rhodium. Catalytic converters are typically located underneath the body of the motor vehicle and can therefore be fairly easily accessible, including for unauthorized personnel.

SUMMARY

Some embodiments of the invention provide a catalytic converter guard for protecting a catalytic converter on a motor vehicle. The catalytic converter guard can include a set of mounting flanges, an input guard plate, an output guard plate, and a bottom plate coupled to the set of mounting flanges, the input guard plate, and the output guard plate. The set of mounting flanges can be configured to be secured to a set of frame rails of a motor vehicle. The input guard plate can be configured to be positioned adjacent an input of at least one catalytic converter and can include at least one cutout shaped to permit at least one input exhaust pipe to pass therethrough. The output guard plate can be configured to be positioned adjacent an output of the at least one catalytic converter and can include at least one cutout shaped to permit at least one output exhaust pipe to pass therethrough. The bottom plate can be configured to extend beneath the catalytic converter.

Some embodiments can provide a catalytic converter guard system for protecting a catalytic converter on a motor vehicle. The catalytic converter guard system can include a set of mounting flanges, a bottom plate coupled to extending between the set of mounting flanges, and a plurality of tamper-resistant fasteners. The set of mounting flanges can be configured to be coupled to a set of frame rails of a motor vehicle with the plurality of tamper-resistant fasteners. The bottom plate can be configured to extend beneath the catalytic converter.

Some embodiments can provide a catalytic converter guard for protecting a catalytic converter on a motor vehicle. The catalytic converter guard can include a five-sided box including four side walls and a bottom wall. Two of the four sidewalls can be configured to be secured to a set of frame rails of the motor vehicle.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
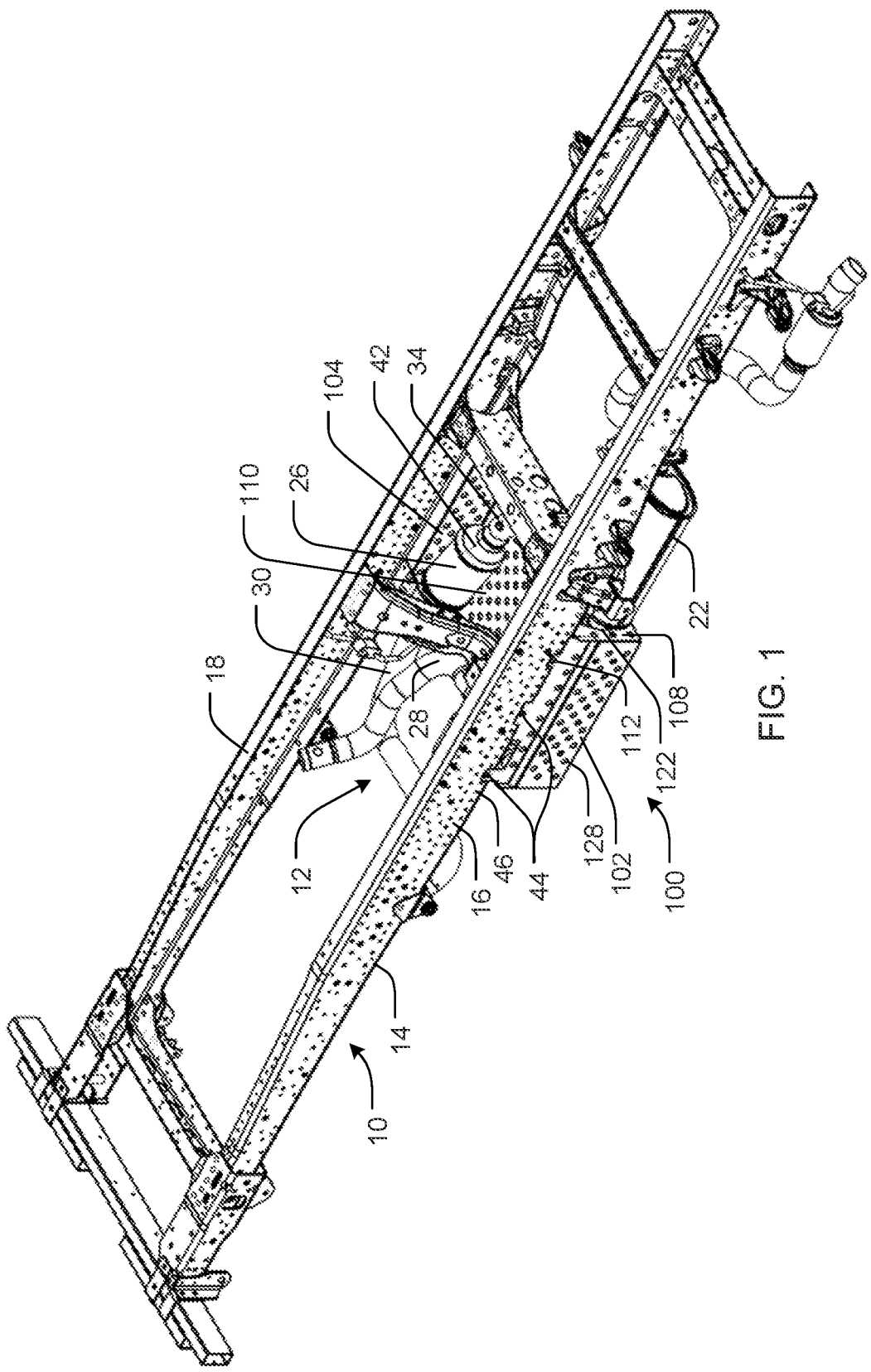
FIG. 1 is a rear top left isometric view of a catalytic converter guard according to an embodiment of the invention installed on a motor vehicle frame with an exhaust system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also as used herein, unless otherwise specified or limited, directional terms are presented only with regard to the particular embodiment and perspective described. For example, reference to features or directions as "horizontal," "vertical," "front," "rear," "left," "right," "upper," "lower," and so on are generally made with reference to a particular figure or example and are not necessarily indicative of an absolute orientation or direction. However, relative directional terms for a particular embodiment may generally apply to alternative orientations of that embodiment. For example, "front" and "rear" directions or features (or "right" and "left" directions or features, and so on) may be generally understood to indicate relatively opposite directions or features for a particular embodiment, regardless of the absolute orientation of the embodiment (or relative orientation relative to environmental structures). "Lateral" and derivatives thereof generally indicate directions that are generally perpendicular to a vertical direction for a relevant reference frame.

Also as used herein, ordinal numbers are used for convenience of presentation only and are generally presented in an order that corresponds to the order in which particular features are introduced in the relevant discussion. Accordingly, for example, a "first" feature may not necessarily have any required structural or sequential relationship to a "second" feature, and so on. Further, similar features may be referred to in different portions of the discussion by different ordinal numbers. For example, a particular feature may be referred to in some discussion as a "first" feature, while a similar or substantially identical feature may be referred to in other discussion as a "third" feature, and so on.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As generally noted above, catalytic converters are typically installed in relatively accessible locations on vehicles. Unfortunately, it has become more and more common for catalytic converters to be forcibly removed from motor vehicles because of the scrap value of the precious metals. Due to the relative ease of access to areas below a vehicle chassis, a thief can simply crawl under a motor vehicle and remove a catalytic converter from the exhaust system by cutting the input and output exhaust pipes on either side of the catalytic converter.

Correspondingly, in some contexts, it may be useful to protect a catalytic converter on a motor vehicle from being forcibly removed (e.g., via sawing the exhaust pipes on either end). Further, it may be useful to be able to install a catalytic converter guard on a motor vehicle as an aftermarket add-on. Embodiments of the invention can be useful for this purpose, and others. For example, embodiments of the invention can be used to cover a catalytic converter to prevent removal of the catalytic converter if both ends are cut from their connection with the exhaust system. As another example, some embodiments of the invention can be positioned around the catalytic converter from below the motor vehicle and secured to the frame with fasteners. In some embodiments, the fasteners can be tamper-resistant fasteners, which may require special tools for removal.

In some embodiments, a catalytic converter guard can include a set of mounting flanges that are configured to be secured to the frame of a motor vehicle. In some embodiments, the mounting flanges have holes for receiving fasteners that can also be received in holes in a frame of the motor vehicle. In some embodiments, the catalytic converter guard can have guard plates positioned to the front and the rear of the catalytic converter, wherein front and rear positions with respect to the catalytic converter are in relation to the front and rear of the motor vehicle. In some embodiments, the catalytic converter guard can have a bottom plate adjoining the mounting flanges and the guard plates and extending underneath the catalytic converter. The mounting flanges, guard plates, and bottom plate can be formed to accommodate various shapes, sizes, and locations of the catalytic converter and frame members.

In some contexts, it may be useful to provide a catalytic converter guard that accommodates components of the drivetrain. In some embodiments, cutouts in the catalytic converter guard can be provided to fit around drivetrain components, such as, for example, transmissions, transfer cases, and/or driveshafts. In some embodiments, openings in a bottom plate of a catalytic converter guard can be provided to allow access to components of the drivetrain for servicing, for example, grease fittings.

In some embodiments, a catalytic converter guard can be configured to reduce the drag imposed on the motor vehicle, as compared to conventional arrangements. For example, apertures can be provided throughout to allow air to pass through the catalytic converter guard. The apertures can also aid in removing heat from exhaust gasses passing through the catalytic converter. Additionally, the removal of material from a catalytic converter guard reduces the weight. The reduction of drag and weight can increase fuel efficiency, as compared to a catalytic converter guard according to the disclosure without material removed.

In some conventional arrangements, catalytic converter protective devices are configured to accommodate a single catalytic converter through a secured clamp or a similarly dimensioned cage. Thus, two catalytic converter protective devices are needed if the motor vehicle has two catalytic converters. This would likely require additional installation time to install two conventional, single, catalytic converter cages. Additionally, individual cage-like catalytic converter protective devices do not extend between frame members and may thus require securing the protective device to a body panel, such as, for example, a floor board. This can increase the likelihood for water penetration at the fastening locations and eventually lead to the floor board (or other body panel) rusting out at those locations. Further, a catalytic converter protective device dimensioned similarly to a catalytic converter is limited to the size of catalytic converter it can protect.

Some embodiments of the invention can address this issue, or others. For example, some embodiments of the invention are presented below in the context of a catalytic converter guard for protecting one or more catalytic converters, wherein the catalytic converter guard extends between and across frame members and effectively encloses the one or more catalytic converter(s) therebetween. Further, the catalytic converter guard can accommodate many different sizes and shapes of catalytic converters, while also accommodating other relevant components (e.g., flow pipes for the relevant exhaust system). Generally, the principles disclosed herein can be used with any variety of catalytic converter configuration.

With regard to construction, various embodiments can be readily formed from a variety of known manufacturing techniques, including bending sheet metal. For example, some embodiments, including the embodiment illustrated in the FIGS., can be stamped as one piece and bent to form. In other embodiments, multiple pieces can be stamped and joined together through methods such as welding or with mechanical fasteners.

FIGS. 1 through 7 illustrate an embodiment of a catalytic converter guard 100 configured to be mounted to a frame 10 of a body-on-frame motor vehicle (not shown) with an exhaust system 12. It is contemplated, however, that in some embodiments, a catalytic converter guard with the same or similar elements and attributes could be configured to be installed on a motor vehicle with a unibody frame.

Figure 7:
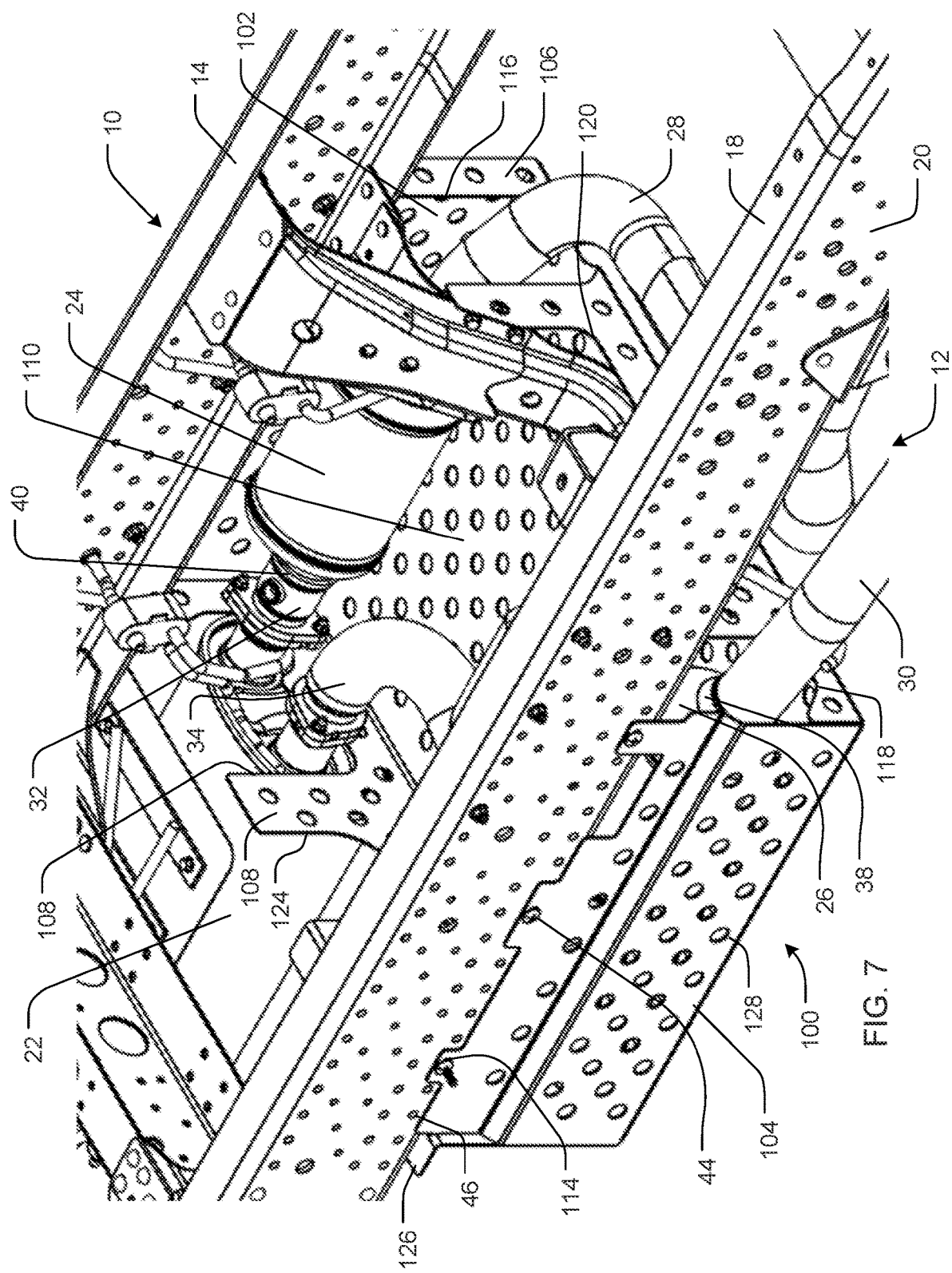
FIG. 7 is a close-up front top right isometric view of the frame, exhaust system, and catalytic converter guard shown in FIG. 1.

The frame 10 has a set of rails including a first rail 14 with an outward facing side 16 and a second rail 18 with an outward facing side 20 (shown in FIG. 7). The exhaust system 12, shown here as an example exhaust system, has a muffler 22; a set of catalytic converters, including a first catalytic converter 24 and a second catalytic converter 26, a set of input exhaust pipes, including a first input exhaust pipe 28 and a second input exhaust pipe 30; and a set of output exhaust pipes, including a first output exhaust pipe 32 and a second output exhaust pipe 34. The first input exhaust pipe 28 extends between an exhaust manifold (not shown) and a first end 36 of the first catalytic converter 24, and the second input exhaust pipe 30 extends between an exhaust manifold (not shown) and a first end 38 of the second catalytic converter 26. The first output exhaust pipe 32 is coupled to and between a second end 40 of the first catalytic converter 24 and the muffler 22, and the second output exhaust pipe 30 is coupled to and between a second end 42 of the second catalytic converter 26 and the muffler 22. It should be noted that the arrangement shown is one example of an exhaust system, other exhaust systems, including, for example, systems with dual mufflers, systems with a single catalytic converter, and other similar configurations are contemplated for use with the catalytic converter guard 100.

Continuing, the catalytic converter guard 100 is shown mounted to the frame 10 and enclosing the first and second catalytic converters 24, 26 in FIGS. 1-7. The catalytic converter guard 100 includes a set of mounting flanges, including a first mounting flange 102 and a second mounting flange 104; an input guard plate 106; an output guard plate 108; and a bottom plate 110. As shown, the first and second mounting flanges 102, 104; the input and output guard plates 106, 108; and the bottom plate 110 can be integrally formed from a single piece of sheet metal stamped and bent to form. However, in some embodiments, one or more of the parts of the catalytic converter guard 100 may be welded or otherwise secured together, such as, for example with tamper-resistant mechanical fasteners.

Figure 4:
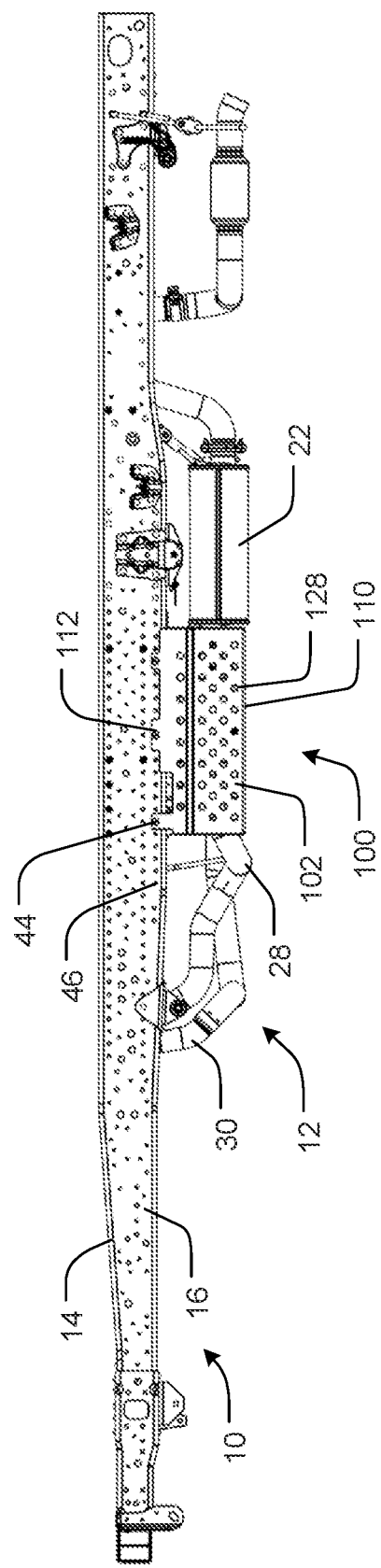
FIG. 4 is a left elevation view of the frame, exhaust system, and catalytic converter guard of FIG. 1.
Figure 5:
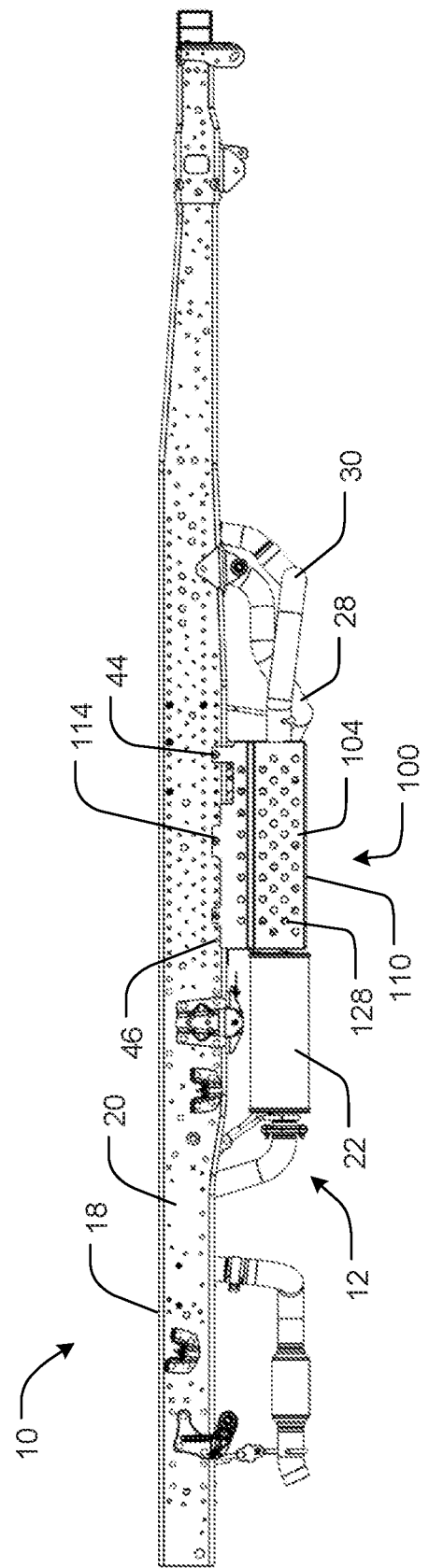
FIG. 5 is a right elevation view of the frame, exhaust system, and catalytic converter guard of FIG. 1.
Figure 6:
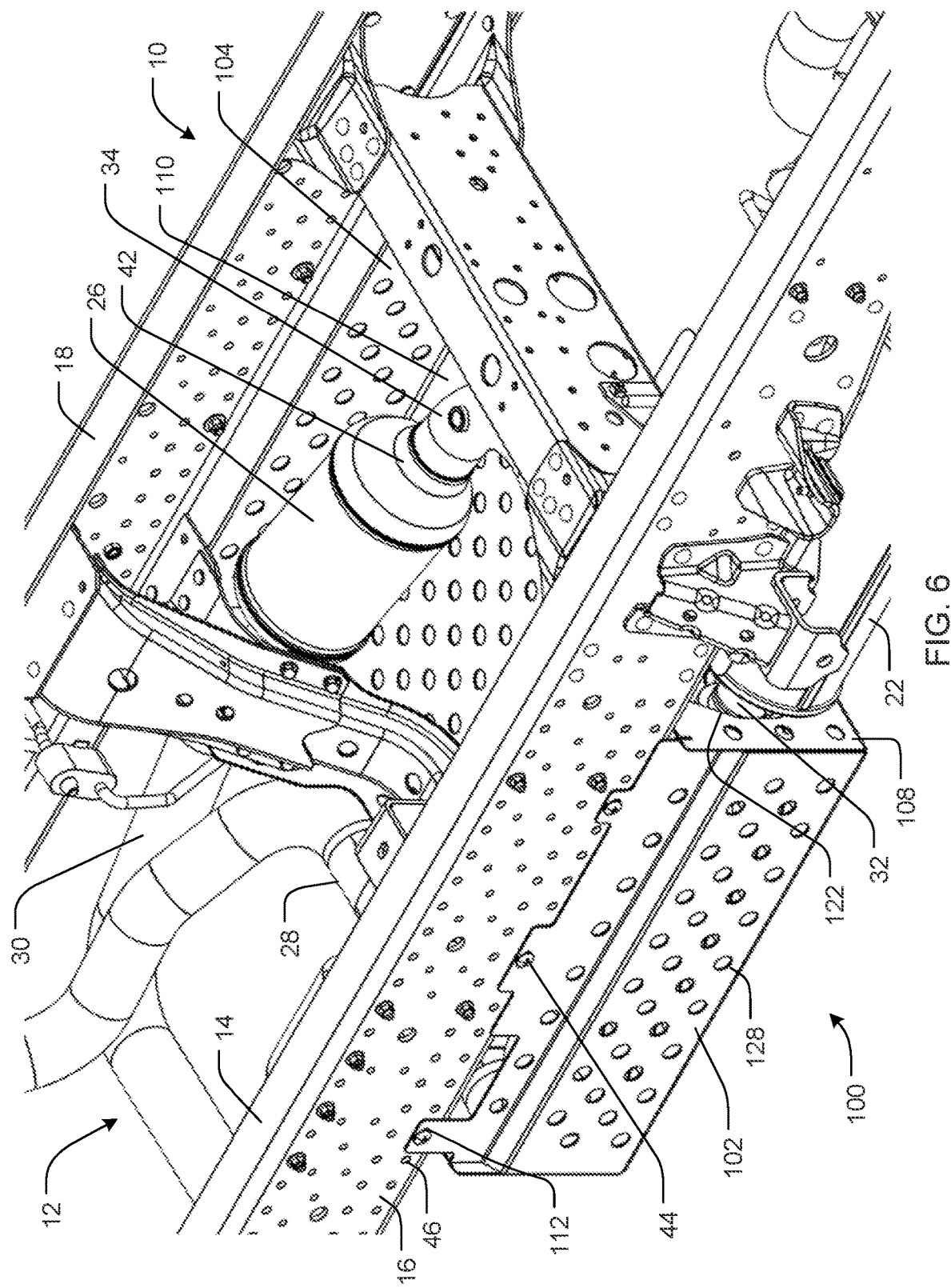
FIG. 6 is a close-up rear top left isometric view of the frame, exhaust system, and catalytic converter guard shown in FIG. 1.

The form of the catalytic converter guard 100 can generally be a box-shape with four side walls (e.g., the first and second mounting flanges 102, 104 and the input and output guard plates 106, 108), a bottom wall (e.g., the bottom plate 110), and an open top. Further, as shown in FIGS. 4 and 5, the catalytic converter guard 100 is sized to not decrease the ground clearance between the exhaust system 12 and the ground. For example, the first and second mounting flanges 102, 104; the input and output guards 106, 108; and the bottom plate 110 do not extend below the muffler 22 or other exhaust components, other than the first and second catalytic converters 24, 26.

The catalytic converter guard 100 can be secured to the frame 10 to the first and second rails 14, 18 with tamper-resistant fasteners 44. The first mounting flange 102 is positioned adjacent the outward facing side 16 of the first rail 14 and has a plurality of mounting holes 112 through which the tamper-resistant fasteners 44 are received and which extend through holes 46 in the first rail 14 to secure the first mounting flange 102 to the first rail 14. Example tamper-resistant fasteners can include tamper-resistant Torx®-head fasteners, tamper-resistant drilled spanner-head fasteners, and tamper-resistant one-way fasteners. (Torx® is a registered trademark of Acument Intellectual Properties, LLC in the United States or other jurisdictions.)

Similar to the first mounting flange 102, the second mounting flange 104 is positioned adjacent the outward facing side 20 of the second rail 18 (shown in FIG. 7). The second mounting flange 104 also has a plurality of mounting holes 114 through which tamper-resistant fasteners 44 are received and which extend through holes 46 in the second rail 18.

Continuing, the first and second mounting flanges 102, 104 can be formed to accommodate the size and shape of the catalytic converters 24, 26, respectively. For example, in the embodiment shown in the figures, each of the first and second mounting flanges 102, 104 are formed with an offset that extend inward toward the respective first and second rail 14, 18. The offset permits the first and second mounting flanges to extend outward from the first and second rails 14, 18 and beyond the first and second outward facing sides 16, 20 to accommodate portions of the first and second catalytic converters 24, 26 that extend beneath the first and second rails 14, 18 without interference. In particular, the offsets of the illustrated example are formed as outwardly angled portions of the flanges 102, 104, between parallel portions thereof above and below the angled portions, as may accommodate easy attachment to the rails 14, 18 as well as laterally protruding locations of the catalytic converters 24, 26. In other embodiments, however, other configurations are possible.

The input and output guard plates 106, 108 are shown in FIGS. 1 and 6-8. The input and output guard plates 106, 108 extend between the first and second mounting flanges 102, 104. The input guard plate 106 is positioned between the exhaust manifolds and the respective first ends 36, 38 (shown in FIGS. 2 and 7, respectively) of the first and second catalytic converters 24, 26. As shown, the input guard plate 106 is located adjacent (i.e., near, close to, or next to, but not necessarily touching) the first ends 36, 38 with the first and second input exhaust pipes 32, 34 located substantially exterior to the catalytic converter guard 100. Further, the input guard plate 106 can include a set of input cutouts, including a first input cutout 116 and a second input cutout 118. The first input cutout 116 is positioned adjacent the first end 36 of the first catalytic converter 24 and is shaped to permit the first input exhaust pipe 28 to pass therethrough. The second input cutout 118 is positioned adjacent the first end 38 of the second catalytic converter 26 and is shaped to permit the second input exhaust pipe 30 to pass therethrough. In some embodiments, more or fewer input cutouts can be provided depending on the configuration of the exhaust system.

Further, a first drivetrain cutout 120 can be provided and configured to allow the catalytic converter guard 100 to fit around drivetrain elements, such as, for example, a transmission, a bell housing, a transfer case, one or more driveshafts, etc. (not shown). As shown, the first drivetrain cutout 120 is located between the first and second input cutouts 116, 118.

Generally, cutouts on guard plates can be configured to accommodate passage of relevant exhaust system (or other) components, including as illustrated in the various FIGS. In some cases, a depth of cutouts can be sufficiently large so that a catalytic converter guard (e.g., the guard 100, as illustrated) can accommodate passage of the relevant components while not increasing the required clearance to ground relative to the relevant exhaust system without the guard, as also generally discussed above. Moreover, the cutouts on guard plates, including as shown for the cutouts 116, 118 122, can exhibit one or more maximum dimensions that are generally less than one or more corresponding maximum dimensions of a catalytic converter, so that even if all of the relevant exhaust pipes are cut, the catalytic converter may still not be removable via the cutouts.

Continuing, the output guard plate 108 is positioned between the second ends 40, 42 of the first and second catalytic converters 24, 26 and the muffler 22. As shown, the output guard plate 108 is located adjacent (i.e., near, close to, or next to, but not necessarily touching) the muffler 22 with the first and second output exhaust pipes 32, 34 located substantially inside the catalytic converter guard 100. In some embodiments, the catalytic converter guard 100 can be configured to route at least one of the first or second exhaust pipes 32, 34 substantially exterior thereto. Further, the output guard plate 108 can include an output cutout 122. The output cutout 122 is positioned adjacent the muffler 22 and is shaped to permit the first and second output exhaust pipes 32, 34 to pass therethrough. In some embodiments, more output cutouts can be provided depending on the configuration of the exhaust system.

Further, a second drivetrain cutout 124 can be provided and configured to allow room for a drivetrain element such as, for example, a driveshaft (not shown) to pass therethrough. As shown, the second drivetrain cutout 124 is located substantially equidistant between the first and second mounting flanges 102, 104.

Figure 8:
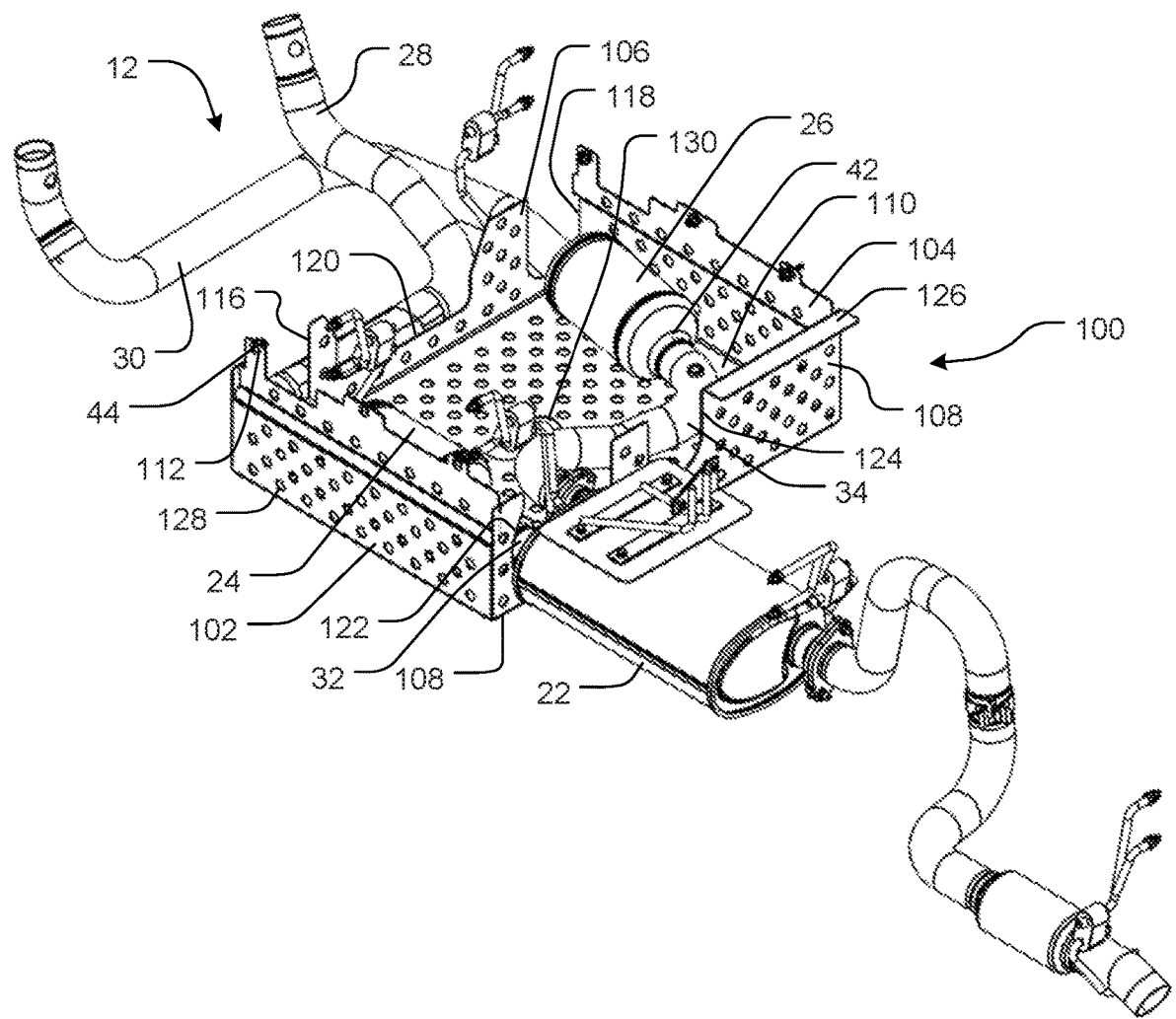
FIG. 8 is a rear top left isometric view of the exhaust system and the catalytic converter guard of FIG. 1 shown in isolation.

Additionally, in some embodiments, the input guard plate 106 and/or the output guard plate 108 can have a stiffening flange. For example, as shown in FIG. 8, the output guard plate 108 has a stiffening flange 126 extending between the output cutout 120 and the second mounting flange 104. The stiffening flange 126 increases the rigidity of the output guard plate 108 over this section.

Figure 2:
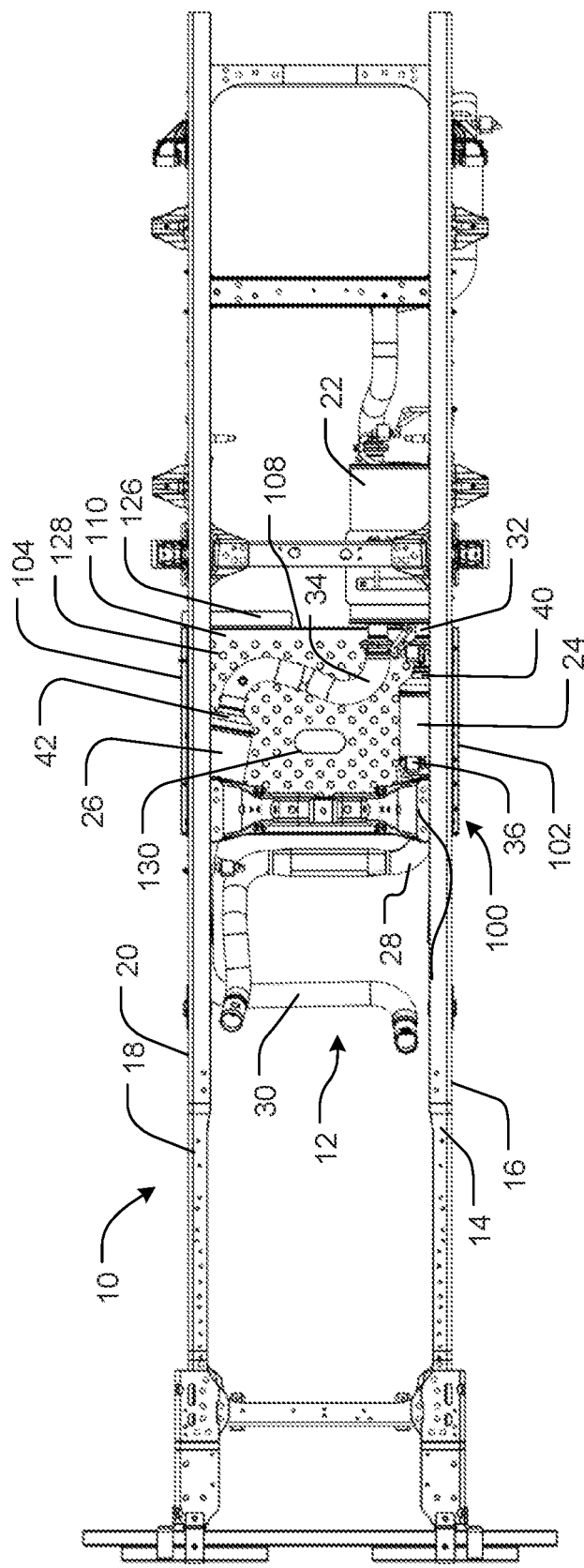
FIG. 2 is a top plan view of the frame, exhaust system, and catalytic converter guard of FIG. 1.
Figure 3:
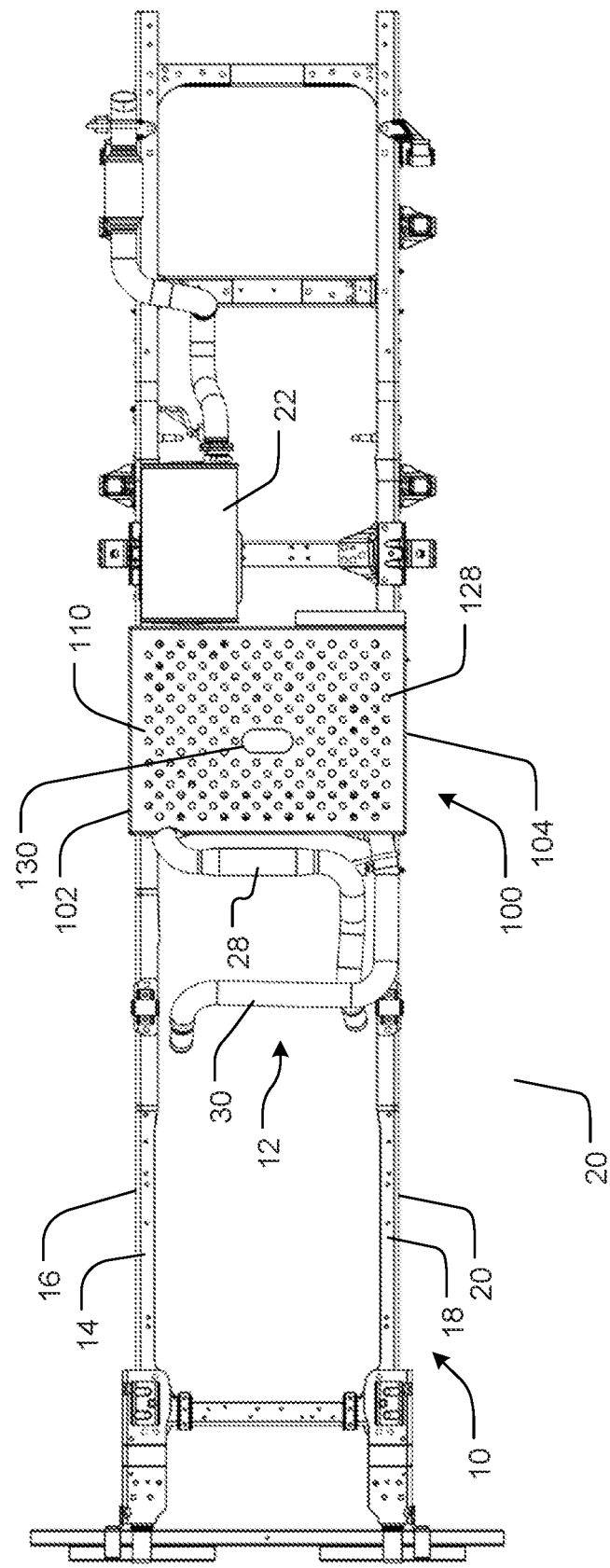
FIG. 3 is a bottom plan view of the frame, exhaust system, and catalytic converter guard of FIG. 1.

Looking at FIGS. 2, 3, and 8, the first and second mounting flanges 102, 104 and the input and output guard plates 106, 108 are shown all coupled to the bottom plate 110. The bottom plate 110 can be a planar piece of material, however, other configurations are contemplated depending on the location of components of the motor vehicle drivetrain and the exhaust system to avoid interference therewith. The bottom plate 110 can include access features, for example, an access slot 130, which can be configured to be positioned below a location on the drivetrain for which access is required for routine maintenance (e.g., a grease fitting on a driveshaft).

Additionally, the catalytic converter guard 100 can include ventilation features to allow airflow therethrough. As shown in FIG. 8, each of the first and second mounting flanges 102, 104; the input and output guard plates 106, 108; and the bottom plate 110 have a plurality of apertures 128. In some embodiments, the apertures 128 can have other shapes and sizes (e.g., elongate slots). The apertures 128 can allow airflow through the catalytic converter guard 100 and allow the heat of exhaust gases to vent outward and away from underneath the motor vehicle. Further, the apertures 128 can provide a path for water or other debris to exit the catalytic converter guard 100. The apertures 128 can also decrease the drag induced by the catalytic converter guard 100 as the motor vehicle is traveling, which otherwise could have an adverse effect on fuel efficiency.

In some implementations, devices or systems disclosed herein can be utilized or installed using methods embodying aspects of the invention. Correspondingly, description herein of particular features or capabilities of a device or system is generally intended to inherently include disclosure of a method of using such features for intended purposes and of implementing such capabilities. Similarly, express discussion of any method of using a particular device or system, unless otherwise indicated or limited, is intended to inherently include disclosure, as embodiments of the invention, of the utilized features and implemented capabilities of such device or system.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A catalytic converter guard for protecting a catalytic converter on a motor vehicle, the catalytic converter guard comprising:
    a set of mounting flanges;
    an input guard plate;
    an output guard plate; and
    a bottom plate extending between the set of mounting flanges, the input guard plate, and the output guard plate;
    with the catalytic converter guard installed on the motor vehicle, the set of mounting flanges are secured to outward facing sides of each frame rail of a set of frame rails of the motor vehicle;
    the input guard plate is positioned adjacent an input of at least one catalytic converter and includes at least one cutout shaped to permit at least one input exhaust pipe to pass therethrough;
    the output guard plate is positioned adjacent an output of the at least one catalytic converter and includes at least one cutout shaped to permit at least one output exhaust pipe to pass therethrough; and
    the bottom plate extends beneath the at least one catalytic converter.

2. The catalytic converter guard of claim 1, wherein at least one of the mounting flanges includes an offset portion configured to accommodate the at least one catalytic convertor positioned at least partially beneath one of the frame rails.

3. The catalytic converter guard of claim 1, wherein at least one of the set of mounting flanges, the input guard plate, the output guard plate, or the bottom plate have a plurality of apertures therein.

4. The catalytic converter guard of claim 1, wherein at least one of the input guard plate or the output guard plate has a stiffening flange.

5. The catalytic converter guard of claim 1, further comprising a set of tamper-resistant fasteners received in the set of mounting flanges and engaging the frame rails to secure the catalytic converter guard thereto.

6. The catalytic converter guard of claim 1, wherein the bottom plate has an access slot for providing access to a drivetrain component of the motor vehicle.

7. The catalytic converter guard of claim 1, wherein at least one of the input guard plate or the output guard plate has a cutout to accommodate a drivetrain component of the motor vehicle.

8. The catalytic converter guard of claim 1, wherein the set of mounting flanges, the input guard plate, the output guard plate, and the bottom plate are integrally formed from a single sheet of metal.

9. A catalytic converter guard system for protecting a catalytic converter on a motor vehicle, the catalytic converter guard system comprising:

a set of mounting flanges;

a bottom plate extending between the set of mounting flanges; and a plurality of fasteners;

with the catalytic converter guard system mounted to the motor vehicle, the plurality of fasteners securing the set of mounting flanges to a set of frame rails of the motor vehicle, and the bottom plate extending beneath the catalytic converter, and at least one of the mounting flanges including an offset portion to position the catalytic convertor at least partially beneath a corresponding one of the frame rails.

10. The catalytic converter guard of claim 9, wherein at least one of the set of mounting flanges or the bottom plate has a plurality of apertures therein.

11. The catalytic converter guard of claim 9, wherein, with the catalytic guard system mounted to the motor vehicle, the set of mounting flanges are secured to outward facing sides of each of the frame rails.

12. The catalytic converter guard of claim 9, wherein the bottom plate has an access slot to provide access to a drivetrain component of the motor vehicle.

13. A catalytic converter guard for protecting a catalytic converter on a motor vehicle, the catalytic converter guard comprising:

a box structure including side walls and a bottom wall;

wherein, with the catalytic converter guard installed on the motor vehicle, two of the side walls are secured to outward facing sides of a set of frame rails of the motor vehicle.

14. The catalytic converter guard of claim 13, wherein, with the catalytic converter guard installed on the motor vehicle, other two walls of the side walls accommodate the pass through of exhaust pipes.

15. The catalytic converter guard of claim 14, wherein, with the catalytic converter guard installed on the motor vehicle, the other two walls also accommodate the pass through of drivetrain elements.

16. The catalytic converter guard of claim 13, wherein the bottom wall has an access slot to provide access to a drivetrain component of the motor vehicle.

17. The catalytic converter guard of claim 13, wherein the side walls include four side walls, and the four side walls and the bottom wall are integrally formed from a single sheet of metal.

18. A motor vehicle comprising:

a frame that includes a set of frame rails; and a catalytic converter guard that includes a box structure with side walls and a bottom wall;

one or more of the side walls being secured with a mounting flange to an outward facing side of a corresponding frame rail of the set of frame rails to secure the box structure to the frame with a catalytic converter within the box structure.

19. The motor vehicle of claim 18, wherein the mounting flange includes an offset portion that aligns the box structure relative to the corresponding frame rail to position the catalytic convertor at least partially beneath the corresponding frame rail.

20. A catalytic converter guard system for protecting a catalytic converter on a motor vehicle, the catalytic converter guard system comprising:

a set of mounting flanges;

a bottom plate extending between the set of mounting flanges; and a plurality of fasteners;

with the catalytic converter guard system mounted to the motor vehicle, the plurality of fasteners securing the set of mounting flanges to a set of frame rails of the motor vehicle, with the bottom plate extending beneath the catalytic converter and including a slot that provides access to a drivetrain component of the motor vehicle.

21. The catalytic converter guard of claim 20, further comprising:

an input guard plate coupled to the bottom plate and including at least one cutout that receives at least one input exhaust pipe therethrough; and an output guard plate coupled to the bottom plate and including at least one cutout that receives at least one output exhaust pipe therethrough;

wherein at least one of the input guard plate or the output guard plate has a cutout that receives a drivetrain component of the motor vehicle therethrough.

* * * * *